No. 771,142. PATENTED SEPT. 27, 1904.
T. W. GLEESON.
ANNUNCIATOR.
APPLICATION FILED JULY 20, 1900.
NO MODEL. 2 SHEETS—SHEET 1.

Witnesses:
Arthur F. Randall
C. B. Maynadier

Inventor:
Thomas W. Gleeson,
by J. B. Maynadier
Attorney.

No. 771,142.　　　　　　　　　　　　　PATENTED SEPT. 27, 1904.
T. W. GLEESON.
ANNUNCIATOR.
APPLICATION FILED JULY 20, 1900.
NO MODEL.　　　　　　　　　　　　　　　　2 SHEETS—SHEET 2.

Witnesses:
Arthur F. Randall
Bausten B. Maynadier

Inventor:
Thomas W. Gleeson
by J. E. Maynadier
Attorney

No. 771,142. Patented September 27, 1904.

UNITED STATES PATENT OFFICE.

THOMAS W. GLEESON, OF BOSTON, MASSACHUSETTS, ASSIGNOR TO ABRAHAM B. COFFIN, OF WINCHESTER, MASSACHUSETTS.

ANNUNCIATOR.

SPECIFICATION forming part of Letters Patent No. 771,142, dated September 27, 1904.

Application filed July 20, 1900. Serial No. 24,301. (No model.)

*To all whom it may concern:*

Be it known that I, THOMAS W. GLEESON, of Boston, in the county of Suffolk and State of Massachusetts, have invented a new and useful Annunciator, of which the following is a specification, reference being had to the accompanying drawings, making a part hereof, in which—

Figure 1:
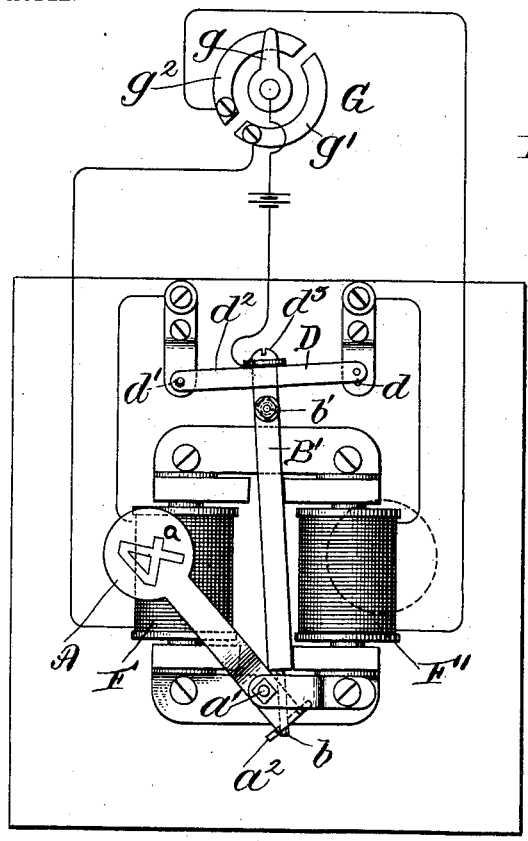
Figure 3:
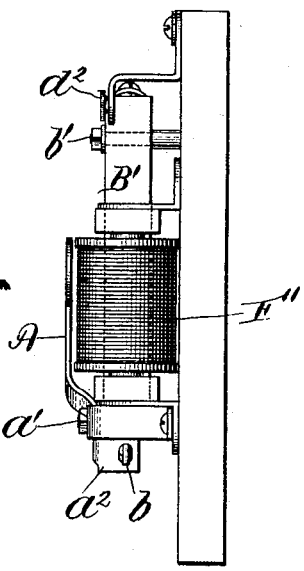
Figure 2:
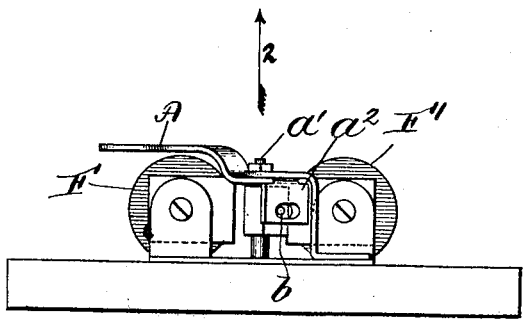
Figure 5:
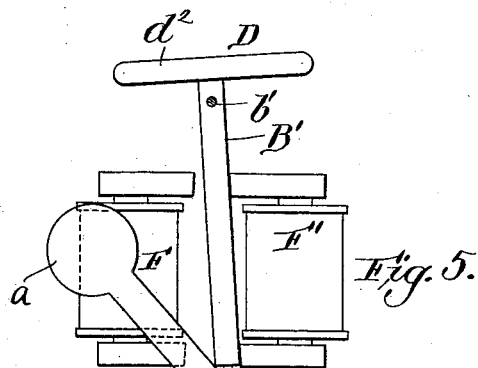
Figure 4:
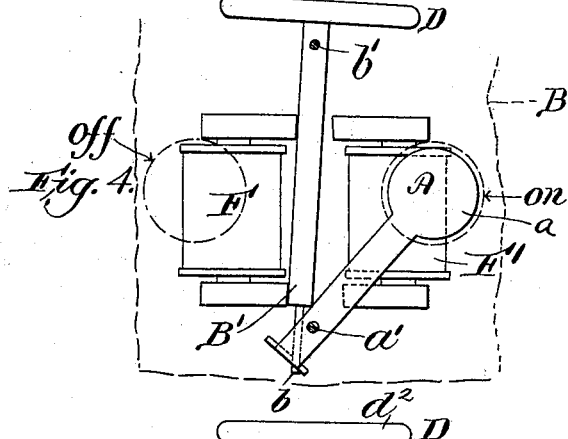
Figure 6:
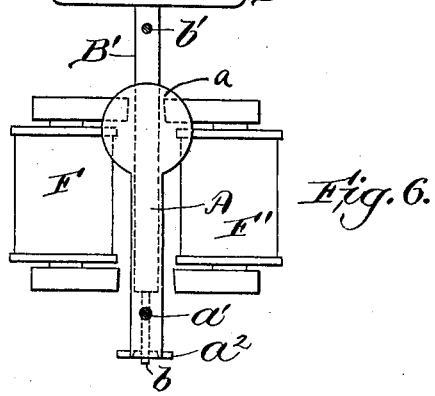

Figure 1 is a front elevation of the working parts of my annunciator with the screen removed. Fig. 2 is an edge view indicated by arrow 2. Fig. 3 is an edge view indicated by arrow 3. Figs. 4, 5, and 6 are diagrams described below.

Annunciators as ordinarily made comprise a screen with one or more holes through it and a "shutter," so called, which is usually an indicating-disk mounted on or controlled by an armature, so that when a magnet is energized the shutter drops or is moved to make the indicating-disk visible through the hole in the screen. Usually the shutter is moved one way only by the action of the magnet; but an annunciator with two magnets whose shutter is moved in one direction by one magnet and back by the second magnet is described in Patent No. 608,100, dated July 20, 1898, to John Lewis Bixby; and my invention is an annunciator of that class and is designed to be used in connection with gas-fixtures, as shown in the Bixby patent, although it is also adapted for use in all cases where any double announcement is desired—as, for example, turning a cock to let on gas moves the shutter and causes the disk to be visible through one hole in the screen, while turning that cock to shut off the gas moves the shutter to another position and either causes the disk to be hidden by the screen or else makes it visible through another hole in the screen. Another example would be in case it was desired to know whether a door was open or shut, when the disk would be visible through a hole marked "Open" or invisible as the door was open or shut, or it might be visible through a hole marked "Open" when the door was open, but through another hole marked "Shut" when the door was shut.

Much difficulty has been found in the manufacture of this double annunciator, for it is essential that the working parts be inexpensive as to both labor and material and the adjustment simple and easily made, and when each instrument must comprise many shutters and a pair of magnets and contacts for each shutter it will be readily seen that any nice adjustment of each shutter and its magnets and contacts is practically prohibitory.

My invention is the combination of a pair of magnets and an armature common to both with a shutter on an axis separate and distinct from the axis of the armature, substantially as explained below, so that when either magnet is energized it attracts its armature, shifts the shutter, and shifts the contacts in order that the other magnet may be energized, and causes the weight of the armature and the weight of the shutter to counterbalance one another and tend to produce a condition of stable equilibrium when the shutter is in either of its two positions.

In Fig. 4 the shutter A is shown with its disk $a$ visible through the hole "On" in the screen B. The center of gravity of shutter A is well above the axis $a'$, on which the shutter is mounted, and therefore the shutter must be held against the force of gravity when in the position shown in Fig. 4, and this is also true when the shutter is in its other position, as indicated in Fig. 5. The armature B' has its center of gravity well below its axis $b'$, so that it would hang vertically were it not supported in its inclined position by shutter A. If shutter A were nicely balanced on its axis $a'$ and armature B' hung vertically from its axis $b'$, as in Fig. 6, a slight push in either direction would cause shutter A to move one hundred and eighty degrees on its axis $a'$, its center of gravity being above its axis $a'$, were it not sooner arrested; but in my invention as soon as shutter A has moved a few degrees on axis $a'$ a portion of shutter A engages a portion of armature B', and hence the momentum of A swings B', and A is brought to rest by swinging B', and both A and B' come to rest in one or the other of the two positions shown in Figs. 4 and 5 after A has passed from the position of unstable equilibrium. (Shown in Fig. 6.)

Armature B' controls switch D substantially as in the Bixby patent—that is, when armature B' is midway between its magnets F and F' both switch-points $d$ and $d'$ are connected by switch-bar $d^2$ with binding-post $d^3$; but when armature B' is nearer magnet F point $d'$ is disconnected from post $d^3$, and when armature B' is nearer magnet F' point $d$ is disconnected from post $d^3$; but all this will be clear to all skilled in the art without further description, as will also the wiring. (Shown diagrammatically in Fig. 1.)

While the details of construction are of comparatively little importance, yet I have found it highly desirable that the armature B' should swing between its magnets and carry a pin which engages a slot near the lower end of shutter A, and this is a second feature of my invention, for when thus constructed the parts may be made in quantities and at the minimum cost and will when assembled be found in practically perfect adjustment.

As it is important that the distance between the armature and the other magnet be as small as possible, I so proportion the parts that the poles of the magnet, in fact, act as stops for the armature, and hence the armature acts as a positive stop for the shutter when the shutter reaches either limit of its motion; but there is no injurious rebound, for the reason that the armature has acted by its weight to retard the movement of the shutter before the action of the armature and magnet as a positive stop takes place. When the parts are properly proportioned, the armature will be arrested by the usual non-magnetic material between the poles of the magnet and the armature when the armature and shutter have come nearly to a standstill, so that the shock will be very slight and the rebound almost imperceptible.

The operation needs but a brief description and is as follows: When switch G is operated by bringing bar $g$ into contact with point $g'$, magnet F will be energized and armature B' will be moved toward magnet F until armature B' reaches or slightly passes the vertical, when the circuit through magnet F will be broken at electrode $d'$ and bar $d^2$, and armature B' will thereafter move against the force of gravity; but when armature B' first moves its pin $b$ engages the end of the slot in the inturned end $a^2$ of shutter A and swings shutter A on its axis $a'$, armature B' carrying shutter A past the vertical, when shutter A keeps on until the slot in end $a^2$ overtakes the pin $b$, when the motion of A is retarded and the motion of B' correspondingly accelerated, which alone would bring both A and B' to a stop, as explained above; but armature B' has by that time closely approached its then inert magnet F and will be positively stopped by F, and shutter A will come to a standstill as soon as armature B' comes to a standstill, whether because armature B' is stopped positively or by gravity; but in either event the stopping of both shutter A and armature B' will be gentle and there will be no injurious rebound. This description applies with manifest changes to operating-switch G by bringing bar $g$ into contact with point $g^2$.

What I claim as my invention is—

In combination a pair of oppositely-disposed electromagnets; an armature pivoted near its upper end one face of which is adjacent to the two active poles of one of the magnets, the other face adjacent to the two active poles of the other; a shutter counterbalancing the armature on an axis separate from the axis of the armature, and swung to one position when the armature is attracted by the two active poles of one magnet, and resting in that position until a main switch is shifted to send a current through the coil of the other magnet; that main switch to determine which of the two magnets shall be in circuit; and an automatic switch operated by the armature to complete a circuit through the coil of one magnet when the main switch and the automatic switch correspond, but to break that circuit as soon as the swing of the armature shifts the automatic switch, and throws the shutter to its new position, where it remains until the main switch is shifted to send a current through the coil of the other magnet, and thereby shift the armature and the shutter back to their former positions.

THOMAS W. GLEESON.

Witnesses:
J. E. MAYNADIER,
ARTHUR F. RANDALL.